US009463766B2

(12) United States Patent
Kapfelsperger et al.

(10) Patent No.: US 9,463,766 B2
(45) Date of Patent: Oct. 11, 2016

(54) BURST DEVICE, HYBRID INFLATOR, AIRBAG MODULE AND VEHICLE SAFETY SYSTEM

(71) Applicant: TRW Airbag Systems GmbH, Aschau am Inn (DE)

(72) Inventors: Thomas Kapfelsperger, Muhldorf (DE); Detlef Last, Muhldorf (DE); Lorenz Seidl, Rechtmehring (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 14/792,670

(22) Filed: Jul. 7, 2015

(65) Prior Publication Data

US 2016/0016532 A1 Jan. 21, 2016

(30) Foreign Application Priority Data

Jul. 21, 2014 (DE) ........................ 10 2014 010 618

(51) Int. Cl.
| | |
|---|---|
| *B60R 21/264* | (2006.01) |
| *B60R 21/272* | (2006.01) |
| *B60R 21/274* | (2011.01) |
| *B60R 21/26* | (2011.01) |

(52) U.S. Cl.
CPC ........... *B60R 21/264* (2013.01); *B60R 21/272* (2013.01); *B60R 21/274* (2013.01); *B60R 2021/26029* (2013.01); *B60R 2021/26076* (2013.01)

(58) Field of Classification Search
CPC ................... B60R 21/264; B60R 2021/26076
See application file for complete search history.

(56) References Cited

U.S. PATENT DOCUMENTS

| | | | | |
|---|---|---|---|---|
| 5,584,505 | A * | 12/1996 | O'Loughlin | .......... B60R 21/272 222/5 |
| 5,813,694 | A * | 9/1998 | Jeong | .................... B60R 21/217 280/737 |
| 2007/0186797 | A1* | 8/2007 | Kurita | .................... B60R 21/26 102/530 |
| 2016/0016531 | A1* | 1/2016 | Seidl | .................... B60R 21/264 102/202.5 |

FOREIGN PATENT DOCUMENTS

WO           0113484           2/2001

* cited by examiner

*Primary Examiner* — Drew Brown
(74) *Attorney, Agent, or Firm* — Tarolli, Sundheim, Covell & Tummino LLP

(57) ABSTRACT

The invention relates to a burst device (10), especially for a hybrid inflator (40) including a burst member (20) delimiting an igniter compartment (25) at least in portions on its inside (21), wherein the burst member (20) in the idle mode can be pressurized with compressed gas on its outside (22) and, in the case of operation, the burst member (20) can be destroyed by an igniter compartment side bursting pressure, in accordance with the invention, the burst device (10) includes a support sleeve (30) arranged in the igniter compartment (25) and including an opening (32), the support sleeve (30) including a collar (34) delimiting the opening (33), wherein the burst member (20) rests on the collar (34) of the support sleeve (30) at least in portions upon pressurization from outside.

23 Claims, 2 Drawing Sheets

BURST DEVICE, HYBRID INFLATOR, AIRBAG MODULE AND VEHICLE SAFETY SYSTEM

RELATED APPLICATION

This application claims priority from German Patent Application No. 10 2014 010 618.7, filed Jul. 21, 2014, the subject matter of which is incorporated herein by reference.

BACKGROUND OF THE INVENTION

The invention relates to a burst device, especially for a hybrid inflator, comprising a burst member delimiting an igniter compartment at least in portions on its inside, wherein the burst member can be pressurized with compressed gas on its outside in the idle mode and, in the case of operation, the burst member can be destroyed by a bursting pressure on the igniter compartment side. In addition, the invention relates to a hybrid inflator, an airbag module and a vehicle safety system.

Occupant restraint systems for automotive vehicles usually include airbag modules comprising an airbag which in the case of crash is inflated so as to reduce the probability of body parts of a vehicle occupant colliding with a vehicle component. In order to inflate the airbag in the case of crash, for example hybrid inflators consisting of a compressed gas tank containing pre-compressed gas and/or fluids and a pyrotechnical subassembly are provided, the pyrotechnical subassembly serving for triggering and/or heating the gas which is originally pre-compressed and will escape in the case of operation. The compressed gas of such hybrid inflator can be closed off in a pressure-tight manner toward the pyrotechnical subassembly by a burst diaphragm or by a burst cap which in the idle mode thus can be or is pressurized on its outer peripheral side with the compressed gas stored in the compressed gas tank. The term "in the idle mode" hereby means that the hybrid inflator has not yet been activated, or, in other words, that the burst cap is provided in an idle position in which no activating signal is provided as yet in response to which the burst cap is to be opened or burst.

The document WO 01/13484 A2, especially FIG. 8, illustrates an afore-described burst cap which is incorporated in a hybrid inflator. The cup-shaped burst cap includes a bottom which at its boundary area is transformed into a sleeve-like side wall and/or is integrally connected to the same by forming a radius. The bottom and the sleeve-like side wall delimit an igniter compartment in which an igniter is accommodated, wherein in the idle mode the burst cap can be or is pressurized with compressed gas on its outer peripheral side. In the case of operation, the burst cap can be destroyed by a bursting pressure on the igniter compartment side by activating the igniter. The shown burst cap has a continuously constant material thickness.

Such hybrid inflator thus comprises a compressed gas tank which may be filled, for example at mom temperature, with a gas or gas mixture having a predetermined pressure, e.g. 580 bar, for example when manufacturing the hybrid inflator. Such pressure or filling pressure may increase, in the idle mode of the hybrid inflator, in the so called high-temperature case, by beating a vehicle interior to e.g. 90° C. by solar radiation up to a maximum filling pressure of approx. 800 bar. When an airbag is triggered, the pyrotechnical subassembly opens the burst diaphragm closing the compressed gas tank or the burst cap closing the compressed gas tank so that the gas pro-compressed in the compressed gas tank inflates the airbag, wherein the pre-compressed gas may be nitrogen, argon, helium, hydrogen, methane or oxygen and/or a mixture of two or more of said gases.

In the case of operation in which the burst cap is to be opened by activating an igniter, said igniter for this purpose has to build up a bursting pressure on the igniter compartment side which is far above the filling pressure prevailing in the compressed gas tank. The igniter does not only have to build up the pressure that would be required for the destruction of the burst cap, when considered isolated per se, but it also has to counteract the filling pressure prevailing in the compressed gas tank, i.e. overcome such counter-pressure, so as to cause destruction of the burst cap, when it is incorporated in such hybrid inflator.

Since the pressure in such compressed gas tank may increase to approx. 800 bar, as described above, extremely high bursting pressures have been necessary so far to open closing diaphragms and/or to open a burst cap. Accordingly, both a burst cap closing the gas tank and a possibly provided diaphragm are subjected to high pressure on the side of the compressed gas tank in the idle mode so that a burst cap is exposed, for example, to extreme bending and deformations and may support against or rest on other components of the hybrid inflator or the gas module, which may have a detrimental effect. Moreover and in addition, the burst cap must be very stable by having appropriate material thickness so as to withstand the afore-described maximum filling pressure in the idle mode.

SUMMARY OF THE INVENTION

It is the object of the present invention to state a further developed burst device to overcome the afore-mentioned drawbacks. In particular, a burst device is to be described which can be opened at a lower bursting pressure on the part of the igniter. It is a further object to develop a hybrid inflator so that a bursting or opening pressure of a burst member or a burst device can be reduced.

Moreover, it is the object of the invention to state an airbag module as well as a vehicle safety system comprising a further developed burst device and a further developed hybrid inflator.

In accordance with the invention, this object is achieved with respect to the burst cap by the subject matter of claim 1, with respect to the hybrid inflator by the subject matter of claim 7, with respect to the airbag module by the subject matter of claim 12 and with respect to the vehicle safety system by the subject matter of claim 13.

Advantageous and expedient configurations of the burst device according to the invention and of the hybrid inflator according to the invention, resp., are described in the sub-claims.

The invention is based on the idea to state a burst device, especially for a hybrid inflator, comprising a burst member delimiting an igniter compartment on its inside at least in portions, the burst member in the idle mode being adapted to be pressurized with compressed gas on its outside and. In the case of operation, the burst member being adapted to be destroyed by an igniter compartment side bursting pressure.

In accordance with the invention, the burst device comprises a support sleeve arranged in the igniter compartment and including an opening, wherein the support sleeve comprises a collar delimiting the opening, wherein the burst member at least in portions rests on the collar of the support sleeve in the case of pressurization from outside.

Accordingly, the burst device comprises at least two elements which are, on the one hand, a burst member and, on the other hand, a support sleeve. The support sleeve serves for supporting the burst member. Consequently, the invention is based on the idea to provide a separate component which serves for supporting the burst member so that the burst member need not be supported by other highly functionally relevant components, such as an igniter. The burst member thus can rest on the support sleeve in the idle mode so that it is prevented from resting on an igniter or an igniter housing and, resp., from contacting the igniter or the igniter housing.

The afore-described burst member can be a burst disk or a burst diaphragm or a burst cap which of preference substantially completely encloses the support sleeve. Since the burst member need not be self-supporting and the support function is adopted completely or almost completely by the support sleeve arranged in the igniter compartment, it is possible to design the wall thickness of the burst member to be smaller than the wall thickness of the support sleeve. The wall thickness of the burst member is preferably formed to be continuously constant and relatively small compared to burst members known so far. Preferably, the burst member has a wall thickness corresponding to half the wall thickness of the support sleeve, especially ⅓ of the wall thickness of the support sleeve, especially ¼ of the wall thickness of the support sleeve, especially ⅕ of the wall thickness of the supped sleeve. This is an especially inexpensive component part. Furthermore, the strength of the support sleeve can be higher than the strength of the burst member.

The support sleeve includes two axial openings which are formed so as to face each other. A second axial opening is preferably associated with an igniter carrier, whereas the first axial opening is associated, for example, with a burst zone of a burst member. The first axial opening is delimited by a peripheral collar of the support sleeve. The preferably radial collar is provided at one axial end of the sleeve-like side wall. The first and/or second axial opening preferably has a circular shape. Through such opening, in the case of operation the burst member can be pressurized with bursting pressure against the filling pressure of the compressed gas tank. The collar can also be referred to as annular bottom element of the support sleeve.

The collar or annular bottom portion of the support sleeve can be inwardly inclined at least in portions in the direction of the sleeve-like side wall of the support sleeve. In other words, the collar or the annular bottom portion encloses with the sleeve-like side wall an angle having a value lower than 90°, especially a value of 10° to 80°, especially a value of 20° to 70°, especially a value of 40° to 60°, especially a value of 50°. Due to such configuration of the collar or the circular bottom portion of the support sleeve inclined inwardly or directed inwardly toward the side wall, the burst member can be optimally supported or the burst member can optimally adapt to the collar or the support sleeve in the area of the collar and, resp., in the area of the first axial opening of the support sleeve, especially upon pressurization acting on its outside. Surprisingly, it has turned out that in an area of the afore-mentioned angle of from 10° to 80°, especially of from 20° to 70°, especially of from 40° to 60° and exactly at a value of 50° the material load, in particular the local material bending of the burst member in the area of the supporting collar is small and is optimally dimensioned with respect to a life of the burst device of many years during which certain pressure variations and thus varying pressurization of the burst member may occur.

By providing an additional support sleeve according to the invention in connection with a burst device on which a burst member can rest in the case of pressurization from outside in the idle mode, the burst member pertaining to the burst device can be opened in the case of substantially lower bursting pressures on the side of the igniter than this is the case with burst caps or burst members known from prior art.

Apart from this, the burst member of the burst device according to the invention, on the other hand, still may exhibit a comparatively high collapse pressure on the part of a compressed gas tank of a hybrid inflator filled with compressed gas, as it is known from prior art burst caps or burst members, which are mounted in such hybrid inflator.

When being pressurized from outside, the burst member can be pressed in portions, especially substantially completely, to an outer face of the support sleeve, especially on the outer peripheral side. In other words, the outer face of the support sleeve is provided with a burst member pressed thereto in the idle mode, i.e. when the burst member is pressurized on its outer peripheral side. The opening of the support sleeve can be formed at an axial end of the support sleeve. Preferably the support sleeve includes a second opening at its second axial end through which an igniter can be positioned in the igniter compartment.

The burst member of the burst device is advantageously formed in one piece, especially by re-forming, preferably by deep-drawing and/or bending and/or extrusion and/or embossing. Such configuration in one piece saves costs as compared to a multi-part burst member in which for example a bottom would have to be connected, e.g. welded, to a side wall. Due to the possible minimization of material concerning the smaller material thickness of the burst member, in this context material costs can be further saved. The reduction of the wall thickness or material thickness is due to additionally providing a separate support sleeve.

The burst member, especially a burst cap, may include a bottom element, a sleeve-like side wall as well as a radially projecting collar, wherein for example the connection to an igniter carrier is enabled with the aid of a radially projecting collar or with the aid of an annularly projecting burst cap portion.

The burst device according to the invention provides that the burst member and the support sleeve arranged in the igniter compartment are not arranged together. In other words, the support sleeve is arranged to be movable relative to the burst element. The hybrid inflator according to the invention comprises a burst device including a burst member which on its inside delimits at least in portions an igniter compartment, wherein in the idle mode the burst member is pressurized on its outside with compressed gas having a filling pressure which has a maximum filling pressure at a functional maximum temperature of the hybrid inflator. In the case of operation, the burst member can be destroyed by an igniter compartment side bursting pressure.

According to the invention, the burst device of the hybrid inflator includes a support sleeve arranged in the igniter compartment and having an opening, the support sleeve comprising a collar delimiting the opening, wherein the burst member rests on the collar of the support sleeve at least in portions with pressurization from outside.

Hence the burst device comprises two members, viz. a burst member and a support sleeve, wherein the outside or outer surface of the burst member in the idle mode is pressurized with compressed gas preferably provided in a compressed gas tank. The case of operation describes the trigger case, i.e. the case in which the compressed gas provided in a compressed gas tank is intended to inflate or inflates an airbag, and accordingly the burst device has to be destroyed by an igniter compartment side bursting pressure.

The thickness of the burst member material is preferably formed so that the igniter compartment side bursting pressure required to destroy the burst cap is lower than the sum of the maximum filling pressure and the filling pressure.

Moreover, the hybrid inflator according to the invention can be configured so that the burst device, especially the burst member is connected, especially welded, to an igniter carrier so that a preferably pyrotechnical igniter protrudes into the igniter compartment of the burst device and the burst device protrudes into an interior of a compressed gas tank. For connecting and/or welding the burst device, especially the burst member, to an igniter carrier the burst member, e.g. a burst cap, may include a radially projecting collar, the collar being preferably formed at the end, especially the vertical end, of the side wall facing away from the bottom of the burst member or the burst cap.

In the case of operation, i.e. when igniting the hybrid inflator, the igniter compartment is fluid-communicated with the interior of the compressed gas tank. Due to the destruction or bursting of the burst member, the compressed gas or pre-compressed gas present in the compressed gas tank can flow into the airbag by a shook wave, triggered by the destruction of the burst member, passing through the compressed gas tank so as to open a further burst diaphragm closing the compressed gas tank so that the airbag is inflated.

The support sleeve of the burst device is preferably arranged between the igniter and, resp., the igniter housing and the burst member. If the burst member is in the form of a burst cap, the support sleeve can be arranged in the interior formed by the burst cap. This is performed, for example, in the form of nested cups or caps. In this way, the burst member or the burst cap is prevented from resting on the igniter or the igniter housing, and thus entailed possibly detrimental pressure effects on the igniter are avoided.

The burst member includes, for instance, a burst zone defined as the zone of the burst member which is destroyed first and bursts first when a bursting pressure is applied. In a burst cap the burst zone preferably is the burst bottom. In a burst disk the burst zone preferably is the centermost portion of the disk and, resp., the center of the burst disk.

Preferably, the burst member and the support sleeve are arranged relative to each other so that the axial opening, especially the first axial opening of the support sleeve, is arranged in axial extension of the burnt zone of the burst member.

The burst zone of the burst member preferably has such distance from the igniter that in the case of maximum pressurization of the burst member from outside, the maximally bent burst zone is spaced from the igniter. The burst zone is laterally supported by the collar of the support sleeve, wherein the centermost portion of the burst zone is bent in the direction of the igniter. In other words, the distance of the burst zone from the igniter has to be selected such that a safety distance is provided so that the burst cap is prevented from resting on the igniter or the igniter housing or the igniter cap in the case of maximum filling pressure or maximum pressurization from outside.

Furthermore, the burst zone of the burst member can be spaced from the igniter such that a minimum expansion space for compressed igniter gas is formed such that in the case of operation the igniter can generate a maximum possible bursting pressure onto the burst zone. In other words, the safety distance between the burst zone and the igniter or the igniter housing or the igniter cap is supposed to be minimized so that the expansion space for the compressed igniter gas is minimized and the igniter preferably can exert the maximum effect on the portion of the burst cap to be opened.

Preferably between the igniter and the support sleeve and/or between the igniter cap and the support sleeve and/or between the igniter housing and the support sleeve a ring, especially an O-ring, is arranged. The arrangement of the ring and, resp., O-ring is performed in the hybrid inflator so that the forces acting on electric connecting elements of the igniter are minimized in the case of pressurization from outside. A ring or O-ring thus serves for damping plugging forces of a connecting plug toward the two igniter pins and/or for compensating for component tolerances.

As regards an airbag module, the object is achieved by the features of claim 12. Such airbag module according to the invention can comprise a burst device according to the invention and/or a hybrid inflator according to the invention.

As regards a vehicle safety system, the object is achieved by the features of claim 13. Hence a vehicle safety system includes a burst device according to the invention and/or a hybrid inflator according to the invention and/or an airbag module according to the invention. Similar advantages are resulting as they have been explained already in connection with the burst device according to the invention and/or with the hybrid inflator according to the invention.

BRIEF DESCRIPTION OF THE DRAWINGS

Hereinafter the invention will be illustrated in detail by way of embodiments with reference to the enclosed schematic figures, in which.

DESCRIPTION

Figure 1:
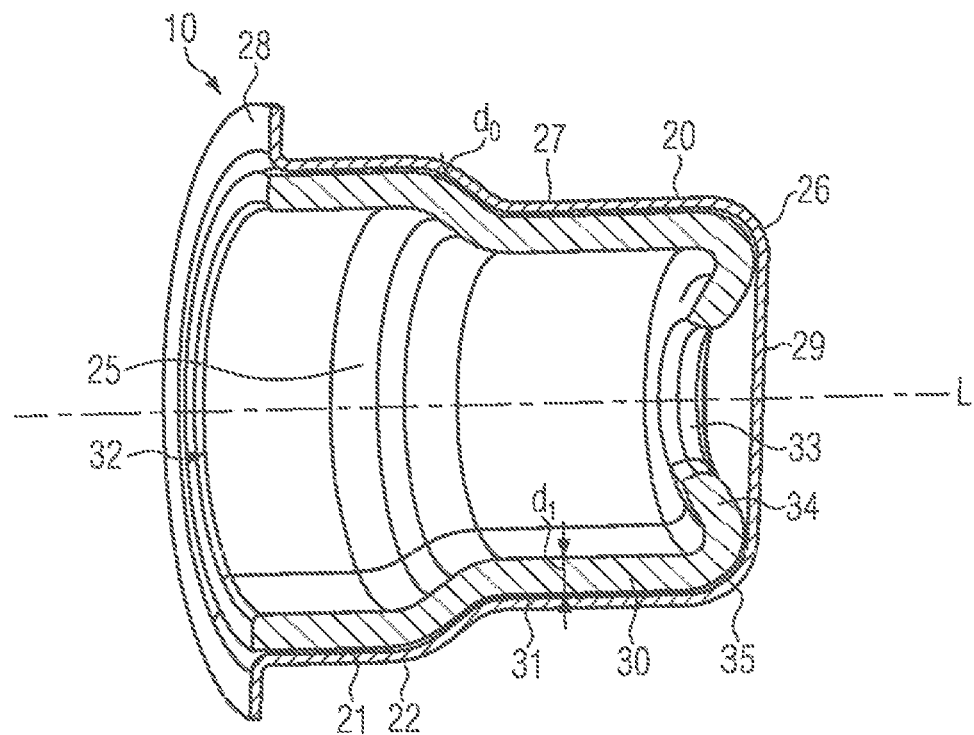
FIG. 1 is a sectional view of a burst device according to the invention without compressed gas being applied to the burst member in accordance with a first embodiment.

Hereinafter for equal and equally acting parts the same reference numerals are used.

FIG. 1 represents a burst device 10 according to the invention, especially for a hybrid inflator. The burst device 10 comprises a burst member 20 which on its inside 21 delimits at least in portions an igniter compartment 25. The burst member 20 may be pressurized with compressed gas on its outside 22 in the idle mode. In the case of operation the burst member 20 can be destroyed by an igniter compartment side bursting pressure. In the igniter compartment 25 a supped sleeve 30 is arranged, the support sleeve including a sleeve-like side wall 31 and a first axial opening 33 as well as a second axial opening 32. The support sleeve 30 further comprises a collar 34 delimiting the first axial opening 33. The burst member 20 rests on the support sleeve 30 when it is pressurized from outside. In the shown example the burst member 20 is not yet pressurized from outside, as still a gap is visible between the burst member 20 and the support sleeve 30.

In the shown example the burst member 20 is a burst cap. The burst cap comprises a bottom 26 and a sleeve-like side wall 27. Further, the burst cap 20 comprises a collar 28 projecting radially outwardly which serves for fastening the burst member 20 to components of a hybrid inflator, for example (cf. FIG. 3). The collar 28 in the shown example is configured to be substantially perpendicularly projecting from the sleeve-like side wall 27, the collar facing outwardly, i.e. away from the igniter compartment 25. The wall thickness do of the burst member 20 is smaller than the wall thickness $d_1$ of the support sleeve 30. The wall thickness $d_0$ of the burst member 20 corresponds to approximately ¼ of the wall thickness $d_1$ of the support sleeve 30. In general the support sleeve 30 should be stiffer than the burst member 20 so that it is also imaginable to design the afore-mentioned difference between the wall thickness do and the wall thickness $d_1$ to be smaller, for example at a ratio of ⅓ or ½, or to design the two wall thicknesses $d_0$ and $d_1$ to be equal; then the strength of the support sleeve 30 can alternatively or additionally be higher than the strength of the burst member 20.

Concerning the illustrated burst member 20 in the form of a burst cap, a burnt zone 29 is defined. Said burst zone 29 is provided at the bottom 26 of the cap. The burst zone 29 is defined centrally at the bottom 26. The burst zone 29 is the portion or area of the burst cap or, resp., the burst member 20 which is destroyed first or bursts first upon pressurization with an igniter compartment side bursting pressure. In other words, the burst zone 29 is formed in the area of the longitudinal axis L of the burst member 20 as well as in the radially closest vicinity of the longitudinal axis L in the bottom 26 of the burst cap. Since the support sleeve 30 includes a first axial opening 33, a bursting pressure can act unhindered on the burst zone 29 starting from the igniter compartment 25.

Since concerning the burst member 20 the material was reduced compared to material thicknesses known from prior art, a bursting pressure lower compared to prior art is required to destroy the burst zone 29. In the shown burst member 20 the wall thickness $d_0$ is continuously smaller than the wall thickness $d_1$ of the support sleeve 30. As the burst member 20 exhibits a preferred continuously constant and small material thickness, in the present case an extremely inexpensive component is provided. The wall thickness $d_0$ of the burst member 20 in this way can be strongly minimized in the way according to the invention as the burst member is pressed against the support sleeve 30 when it is pressurized with compressed gas from outside.

In the shown example, no compressed gas acts on the burst member 20. That is to say, the compressed gas tank not shown here is unpressurized, i.e. there is still no precompressed gas provided in the compressed gas tank. This can be inferred, inter alia, in FIG. 1 from the fact that a gap is visible between the burst member 20 and the support sleeve 30. Moreover, the bottom 26 and, resp., the burst zone 29 are formed perpendicularly to the sleeve-like side wall 27 of the burst member 20. Upon pressurization the bottom 26 and, resp., the burst zone 29 would have to be bent.

Figure 2:
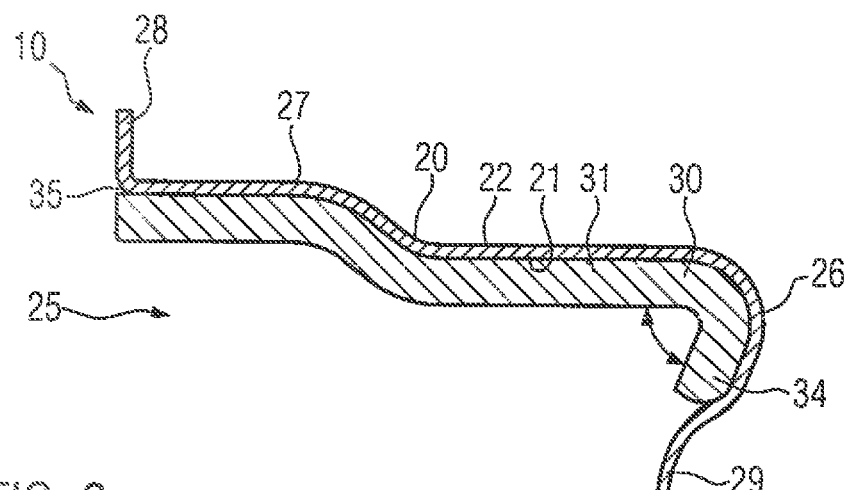
FIG. 2 is a sectional view of a burst device according to the invention in accordance with the embodiment according to FIG. 1 when compressed gas is applied to the burst member.

In FIG. 2, just as in FIG. 1, a burst device 10 according to the invention is shown in section, wherein compressed gas is applied to the burst member 20 on its outside 22, i.e. on the part of an interior of a compressed gas tank. In other words, FIG. 2 illustrates the burst device 10 represented in FIG. 1, however with pressurization in the compressed gas tank, as it is the case with a completely assembled hybrid inflator according to the invention. As regards concurrent reference numerals and the meaning thereof, the explanations regarding the embodiment according to FIG. 1 are referred to.

As described already in the foregoing, in FIG. 2 the bottom 26 is definitely curved, which is caused by pressurization in a compressed gas tank. The burst member 20 and the burst cap shown is pressed substantially completely against the outer face 35 of the support sleeve 30 in the state pressurized with compressed gas. The bottom 28, too, is pressed substantially completely against the collar 34. Moreover, the burst zone 29 is curved in the direction of the second axial opening 32 of the support sleeve 30. In the shown example, the collar 34 is inwardly inclined in the direction of the sleeve-like side wall 31. In other words, the collar 34 projects obliquely inwardly, i.e. obliquely into the igniter compartment 25, relative to the sleeve-like side wall 21. The collar 34 encloses an angle α which is smaller than 90° with the sleeve-like side wall 31. In the shown example, the value of the angle α is approximately 50°. By reason of the design of the collar 34 which is inclined inwardly and, resp., into the igniter compartment 25 toward the sleeve-like side wall 31, optimum support of the burst member 20 against the bottom 28 is achieved.

Both the first axial opening 33 and the second axial opening 32 have a preferably circular shape, wherein through the first preferably circular axial opening 33, in the case of operation, the burst cap or the burst member 20, especially the bottom 26 and especially the burst zone 29, is deformed against a filling pressure and is finally ruptured and opened.

Figure 3:
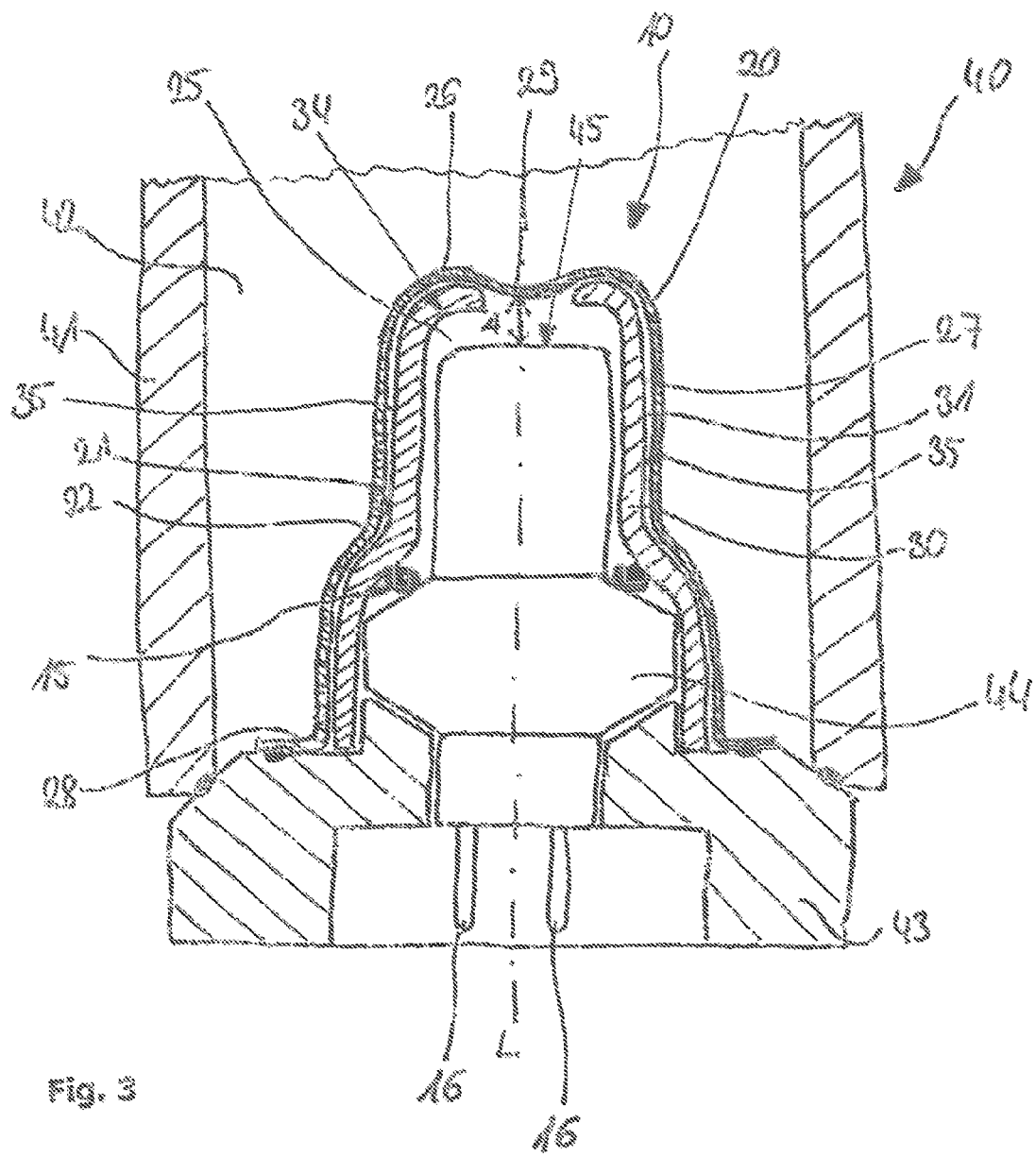
FIG. 3 shows a sectional view of an igniter-side portion of a hybrid inflator according to the invention comprising a burst device according to the invention without compressed gas being applied to the burst member.

FIG. 3 illustrates an igniter side portion of a hybrid inflator 40 according to the invention including a burst device 10. As regards concurrent reference numerals and the meaning thereof, the explanations regarding the embodiment according to FIGS. 1 and 2 are referred to.

The hybrid inflator 40 comprises a compressed gas tank 41 including an interior 42. For reasons of clarity, a complete representation of the compressed gas tank 41, viz. a closure of the compressed gas tank 41 pressure-tight to the top, was renounced.

In FIG. 3 the interior 42 is unpressurized, i.e., no precompressed gas is provided in the interior 42 so far and merely the atmospheric ambient pressure is prevailing here. This can be inferred in FIG. 3, inter alia, from the fact that a clearance or gap is visible between the burst member 20 and the support sleeve 30. Moreover, the burst zone 29 and, resp., the bottom 26 is very little biased or pre-shaped.

If the compressed gas tank 41 is filled with compressed gas, the burst zone 29 is definitely curved toward the igniter. The compressed gas to be filled into the compressed gas tank 41 may be pre-compressed gas such as e.g. nitrogen, argon, helium, hydrogen, methane or oxygen, or a mixture of two or more of these gases. The compressed gas tank 41 can be pressurized at room temperature with a pressure of 580 bar, wherein said pressure can increase to approx. 800 bar in the case of high temperature, i.e. with a vehicle interior heated in the sun, of up to 90° C. With said functional maximum temperature of 90° C. of the hybrid inflator a maximum fling pressure of 800 bar is reached in the idle mode of the hybrid inflator.

In the shown example, also the illustrated igniter compartment 25 is still unpressurized or, resp., merely atmospheric pressure is prevailing there, as the igniter 44 has not yet been activated or ignited in the idle mode.

In FIG. 3 moreover an igniter carrier 43 as well as the igniter 44 is shown. The burst member 20 is tightly connected, especially welded, to the igniter carrier 13 so as to obtain tightness for a compressed gas to be filled into the interior 42 of the compressed gas tank 41. Welding and, resp., connecting the burst member 20 to the igniter 23 is preferably effectuated by welding the collar 28 of the burst member 20 to the igniter carrier 43.

The support sleeve 30 is arranged between the igniter 44 and, resp., the igniter cap thereof and the burst member 20. Thus the burst member 20 is prevented from contacting the igniter 44. The burst member 20 resting on the igniter 44 might entail detrimental effects. In the case of operation, the igniter compartment 25 is fluid-communicated with the interior 42 of the compressed gas tank 41. An O-ring 15 is arranged between the igniter 44 and the support sleeve 30. Primarily, the O-ring 15 is intended to dampen plugging forces of a connecting plug toward the two igniter pins 16.

The burst zone 29 of the burst member 20 should have such distance A from the igniter 44, especially from the bottom 45 of the igniter cap, that in the case of maximum pressurization from outside, i.e. pressurization of the burst member 20 in the interior 42 of the compressed gas tank 41, the maximally bent burst zone 29 is spaced from the igniter 44, especially from the bottom 45 of the igniter cap. Accordingly, a sufficiently large safety distance A shall be selected so that the burst member, especially the burst zone 29, is safely prevented from resting on the igniter 44 in the case of maximum pressurization from outside.

On the other hand, the distance A is supposed to be as small as possible. In other words, the burst zone 29 of the burst member 20 is to have such distance A from the igniter 44, especially from the bottom 45 of the igniter cap, that a minimum expansion space for a compressed igniter gas is formed such that in the case of operation, i.e. upon activation of the hybrid inflator 40, the igniter 44 can generate a maximum possible bursting pressure onto the burst zone 29.

In the case of operation, viz. If a signal for activating the hybrid inflator is provided, the igniter 44 generates a bursting pressure so as to open the burst member 20 from outside. By "outside" the igniter side or the igniter compartment 25 is meant, as mentioned already. Upon ignition of the hybrid inflator, starting from the igniter 44 the bursting pressure flows through the first axial opening 33 of the support sleeve 30 to the burst zone 29. By destroying and, resp., bursting of the burst zone 29 the compressed gas or pre-compressed gas prevailing in the compressed gas tank 41 can flow into the airbag in that, for example, a shock wave triggered by the destruction of the burst member 20 passes through the compressed gas tank so as to open a further burst diaphragm or a further burst member not shown which closes the compressed gas tank so that the airbag is inflated.

In the shown example, the collar 34 of the support sleeve 30 is formed perpendicularly to the sleeve-like side wall 31. In other words, a vertical annular bottom portion 34 is connected to the sleeve-like side wall 31.

In order to be capable of optimally guiding the bursting pressure to the burst zone 29, the igniter 44, the support sleeve 30 and the burst member 20 are arranged preferably concentrically or symmetrically around the shown longitudinal axis L.

LIST OF REFERENCE NUMERALS

10 Burst device
15 O-ring
16 igniter pin
20 burst member
21 inside
22 outside
25 igniter compartment
26 bottom
27 sleeve-like side wall
28 collar
29 burst zone
30 support sleeve
31 sleeve-like side wall
32 (second axial) opening
33 (first axial) opening
34 collar
35 outer face
40 hybrid inflator
41 compressed gas tank
42 interior
43 igniter carrier
44 igniter
45 bottom of igniter cap
$d_0$ wall thickness of burst member
$d_1$ wall thickness of support sleeve
$\alpha$ angle between collar and sleeve-like side wall
A distance from the burst zone to the igniter
L longitudinal axis

The invention claimed is:

1. A burst device (10), for a hybrid inflator (40), comprising
a burst member (20) delimiting an igniter compartment (25) on its inside (21) at least in portions, wherein in an idle mode the burst member (20) can be pressurized with compressed gas on its outside (22) and in the case of operation the burst member (20) can be destroyed by an igniter compartment side bursting pressure,
wherein a support sleeve (30) arranged in the igniter compartment (25) comprising an opening (33), the support sleeve (30) comprising a collar (34) delimiting the opening (33), wherein the collar (34) is at least in portions inclined inwardly toward a sleeve-like side wall (31) of the support sleeve (30), wherein an angle ($\alpha$) is formed between the collar (34) and the sleeve-like side wall (31) which has a value smaller than 90°,
wherein the burst member (20) at least in portions rests on the collar (34) of the support sleeve (30) upon pressurization from outside.

2. The burst device (10) according to claim 1, wherein the burst member (20) is one of a burst disk, a burst diaphragm, and a burst cap wherein, in the case of a burst cap, the burst cap substantially completely encloses the support sleeve (30).

3. The burst device (10) according to claim 1, wherein the wall thickness of the burst member ($d_0$) is smaller than the wall thickness of the support sleeve ($d_1$) and/or the strength of the support sleeve (30) is higher than the strength of the burst member (20).

4. The burst device (10) according to claim 1, wherein the burst member (20) is pressed in portions, against an outer face (35) of the support sleeve (30) upon pressurization from outside.

5. The burst device (10) according to claim 1, wherein the burst member (20) is formed in one piece, by at least one of re-forming, deep-drawing, bending, extrusion and embossing.

6. A hybrid inflator (40) comprising a burst device (10) according to claim 1.

7. The hybrid inflator (40) according to claim 6, wherein the burst device (10) is connected to an igniter carrier (43) so that an igniter (44) protrudes into the igniter compartment (25) of the burst device (10) and the burst device (10) protrudes into an interior (42) of a compressed gas tank (41), the support sleeve (30) being arranged between the igniter (44) and the burst member (20).

8. The hybrid inflator (40) according to claim 7, wherein a burst zone (29) of the burst member (20) has such distance (A) from the igniter (44) that upon maximum pressurization of the burst member (20) from outside the burst zone (29) in a maximally bent condition is spaced from the igniter (44).

9. The hybrid inflator (40) according to claim 7, wherein the burst zone (29) of the burst member (20) has such distance (A) from the igniter (44) that a minimum expansion space for a compressed igniter gas is formed so that in the case of operation the igniter (44) can generate a maximum possible bursting pressure onto the burst zone (29).

10. The hybrid inflator (40) according to claim 7, wherein the case of operation the igniter compartment (25) is fluid-communicated with the interior (42) of the compressed gas tank (41), wherein an O-ring (15) is arranged between the igniter (44) and the support sleeve (30).

11. An airbag module comprising a burst device (10) according to claim 1.

12. A vehicle safety system comprising the burst device (10) claim 1.

13. An airbag module comprising a hybrid inflator (40) according to claim 6.

14. A vehicle safety system comprising the hybrid inflator (40) according to claim 6.

15. A vehicle safety system comprising the airbag module according to claim 11.

16. The burst device (10) according to claim 1, wherein the angle (α) formed between the collar (34) and the sleeve-like side wall (31) has a value from 10° to 80°.

17. The burst device (10) according to claim 1, wherein the angle (α) formed between the collar (34) and the sleeve-like side wall (31) has a value from 20° to 70°.

18. The burst device (10) according to claim 1, wherein the angle (α) formed between the collar (34) and the sleeve-like side wall (31) has a value from 40° to 60°.

19. The burst device (10) according to claim 1, wherein the angle (α) formed between the collar (34) and the sleeve-like side wall (31) has a value about 50°.

20. The burst device (10) according to claim 1, wherein the opening (33) of the support sleeve (30) is formed at an axial end of the support sleeve (30).

21. The burst device (10) according to claim 1, wherein the support sleeve (30) includes a second opening (32) at its second axial end through which an igniter (44) can be positioned in the igniter compartment (25).

22. A burst device for a hybrid inflator comprising:
a burst member extending along a longitudinal axis and having an inside and an outside, at least portions of the inside delimiting an igniter compartment, wherein in an idle mode the outside can be pressurized with compressed gas and in the case of operation the burst member can be destroyed by an igniter compartment side bursting pressure; and
a support sleeve arranged in the igniter compartment and including a first opening delimited by a collar and a second opening, the inside of the burst member engaging the support sleeve in the axial direction from the first opening to adjacent the second opening, wherein a portion of the burst member rests on the collar of the support sleeve upon pressurization from outside.

23. The burst device according to claim 22, wherein a portion of the collar is axially spaced from the burst member during the idle mode such that the burst member portion is movable into engagement with the collar portion upon pressurization from outside.

* * * * *